US011927898B2

(12) United States Patent
Jang et al.

(10) Patent No.: US 11,927,898 B2
(45) Date of Patent: Mar. 12, 2024

(54) DEVELOPING DEVICE WITH SEALING STRUCTURE TO SEAL SHUTTER FOR DEVELOPER INLET OF DEVELOPER SUPPLY PORTION

(71) Applicant: Hewlett-Packard Development Company, L.P., Spring, TX (US)

(72) Inventors: Hojin Jang, Seongnam-si (KR); Jongin Kim, Seongnam-si (KR); Jonghyun Park, Seongnam-si (KR); Janghyun Son, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/023,665

(22) PCT Filed: Jan. 27, 2021

(86) PCT No.: PCT/US2021/015185
§ 371 (c)(1),
(2) Date: Feb. 27, 2023

(87) PCT Pub. No.: WO2022/066203
PCT Pub. Date: Mar. 31, 2022

(65) Prior Publication Data

US 2023/0280677 A1 Sep. 7, 2023

(30) Foreign Application Priority Data

Sep. 23, 2020 (KR) ........................ 10-2020-0122969

(51) Int. Cl.
*G03G 15/08* (2006.01)

(52) U.S. Cl.
CPC ..... *G03G 15/0898* (2013.01); *G03G 15/0886* (2013.01); *G03G 2215/0692* (2013.01)

(58) Field of Classification Search
CPC ........... G03G 15/0898; G03G 15/0886; G03G 15/0881; G03G 2215/0692
(Continued)

(56) References Cited

U.S. PATENT DOCUMENTS

| | | | | |
|---|---|---|---|---|
| 5,974,286 A | 10/1999 | Ban et al. | | |
| 6,438,345 B1 * | 8/2002 | Ban | G03G 15/0886 222/DIG. 1 | |

(Continued)

FOREIGN PATENT DOCUMENTS

| | | |
|---|---|---|
| JP | 08-062981 A | 3/1996 |
| JP | 09-120205 A | 5/1997 |

(Continued)

*Primary Examiner* — Robert B Beatty
(74) *Attorney, Agent, or Firm* — Foley & Lardner LLP

(57) ABSTRACT

An example developing device includes a developing case, a developer supply portion connected to the developing case and including a supply port, a shutter to open or close the supply port, and a sealing member attached to an outer circumferential portion of the developer supply portion to prevent leakage of a developer through the developer supply portion and the shutter. The developer supply portion includes a slit portion adjacent to the supply port. The sealing member includes a film member having an opening in communication with the supply port, a fixing portion inserted into the slit portion, and an elastic sealing member. An upper surface of the film member contacts an inner circumferential portion of the shutter, and the elastic sealing member is attached onto a lower surface of the film member along an edge of the opening and surrounds the supply port.

17 Claims, 10 Drawing Sheets

(58) Field of Classification Search
USPC .......................................... 399/103, 105, 106
See application file for complete search history.

(56) References Cited

U.S. PATENT DOCUMENTS

| | | | | |
|---|---|---|---|---|
| 2007/0212119 | A1 | 9/2007 | Kurenuma et al. | |
| 2008/0019730 | A1 | 1/2008 | Yoon et al. | |
| 2009/0087215 | A1* | 4/2009 | Sakuma | G03G 15/0877 399/105 |
| 2015/0331362 | A1* | 11/2015 | Azeyanagi | G03G 21/105 399/102 |
| 2017/0285516 | A1* | 10/2017 | Oniki | G03G 15/00 |
| 2017/0285565 | A1* | 10/2017 | Sato | G03G 15/0886 |
| 2019/0086837 | A1 | 3/2019 | Nishiyama et al. | |

FOREIGN PATENT DOCUMENTS

| | | | | |
|---|---|---|---|---|
| JP | 2006-058698 | A | 3/2006 | |
| JP | 2017138361 | A * | 8/2017 | G03G 15/0881 |
| KR | 10-2007-0028771 | A | 3/2007 | |
| RU | 2349948 | C2 | 3/2009 | |
| WO | 2006/093361 | A1 | 9/2006 | |
| WO | 2012/043876 | A1 | 4/2012 | |
| WO | 2016/017828 | A1 | 2/2016 | |

* cited by examiner

DEVELOPING DEVICE WITH SEALING STRUCTURE TO SEAL SHUTTER FOR DEVELOPER INLET OF DEVELOPER SUPPLY PORTION

CROSS-REFERENCE TO RELATED APPLICATIONS

This application is filed under 35 U.S.C. § 371 as a National Stage of PCT International Application No. PCT/US2021/015185, filed Jan. 27, 2021, which claims priority to Korean Patent Application No. 10-2020-0122969, filed Sep. 23, 2020, which are incorporated by reference herein in their entireties.

BACKGROUND

An image forming apparatus using an electrophotographic method may form a visible toner image on a photoconductor by supplying a toner to an electrostatic latent image formed on the photoconductor, transferring the visible toner image to a printing medium, and fusing the transferred toner image on the printing medium to print an image on a recording medium.

A developing device accommodates the toner or the toner and a carrier and supplies the toner to the electrostatic latent image formed on the photoconductor to form the visible toner image on the photoconductor. The toner or the toner and carrier may be supplied from a developer cartridge to a developing device. In various cases, such as a case where the toner or the toner and carrier accommodated in the developer cartridge are consumed, the developer cartridge may be replaced with a new developer cartridge.

DETAILED DESCRIPTION

Figure 1:
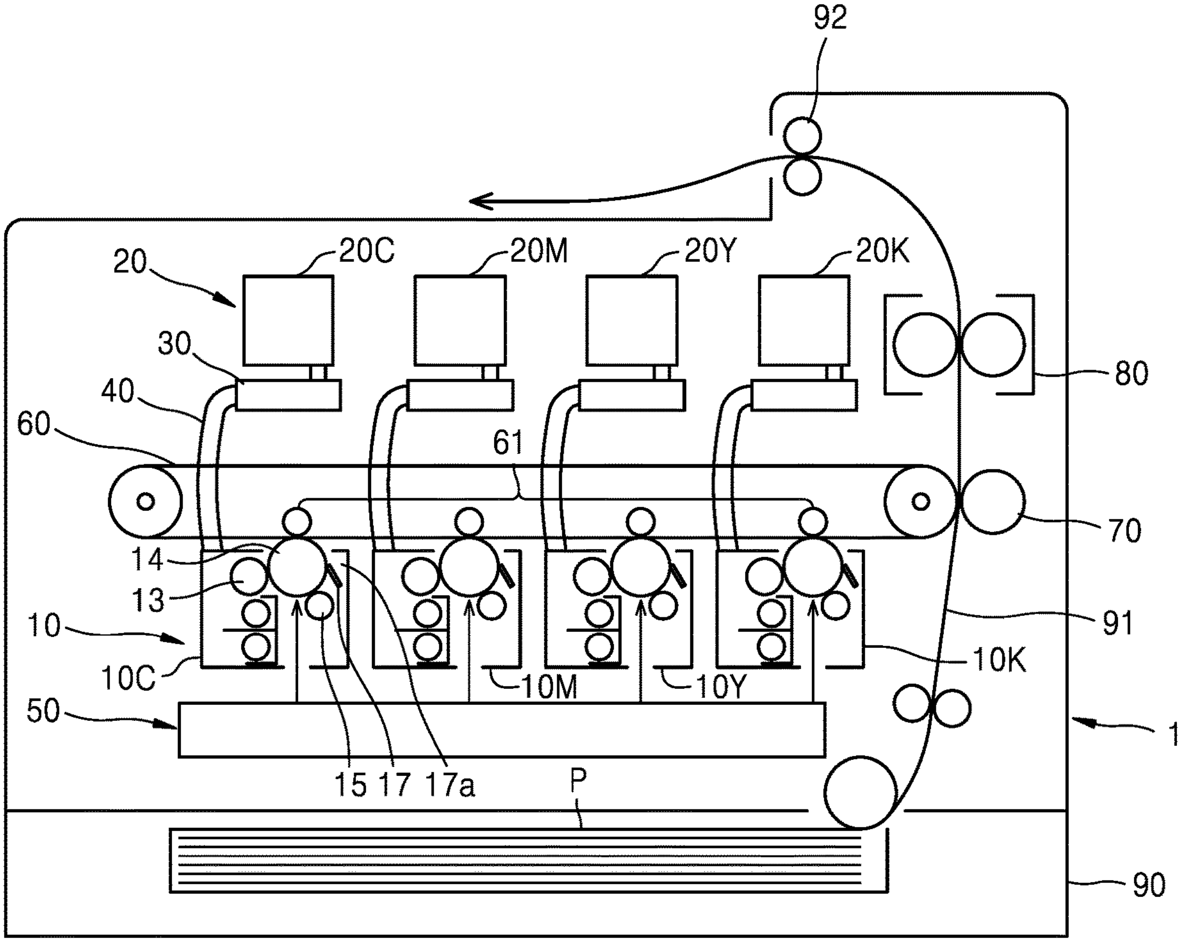
FIG. 1 is a schematic diagram of an image forming apparatus using an electrophotographic method, according to an example.

An image forming apparatus using an electrophotographic method includes a developing device that provides an electrostatic latent image formed on a photoconductor with a toner to form a visible toner image. A developer accommodated in a developer cartridge, for example, the toner or the toner and a carrier, is supplied to the developing device through a developer supply port provided in the developing device. In a case where the developing device is separated from the image forming apparatus, the developer supply port may be closed such that the developer does not leak out. In a case where the developing device is mounted on the image forming apparatus, the developer supply port may be opened. To that end, the developing device is provided with a shutter to open or close (e.g., expose or cover) the developer supply port. For example, the shutter may be slid between positions at which the developer supply port is opened or closed. The shutter may be able to be slid to a developer supply portion provided with the developer supply port. If an assembly tolerance between the shutter and the developer supply portion is large, a gap may be formed between the shutter and the developer supply portion, and accordingly the developer may leak out. If an assembly tolerance between the shutter and the developer supply portion is small, an operation load of the shutter increases. In addition, if foreign matter, for example, the developer is caught between the shutter and the developer supply portion, the operation load of the shutter may be further increased.

In a developing device according to an example, a sealing member may be interposed between the developer supply portion provided with the developer supply port and the shutter to reduce or prevent leakage of the developer. The sealing member may have a double structure including a film member to reduce the operation load of the shutter, and an elastic sealing member to reduce or prevent leakage of the developer. An upper surface of the film member may contact an inner circumferential surface of the shutter to reduce frictional resistance. The elastic sealing member may be disposed on a lower surface of the film member so as to surround the developer supply port to reduce or prevent leakage of the developer. The film member may be partially attached to an outer circumferential portion of the developer supply portion. In order to avoid an occurrence of the film member falling out of the developer supply portion or moving in an operational direction of the shutter when the shutter is operated, the developer supply portion may be provided with a slit portion that penetrates from the outer circumferential portion to an inner circumferential portion of the developer supply portion, and a portion of the film member may be inserted into the slit portion. The developing device may include a developer discharge portion that forms a discharge passage for excess developer. The developer discharge portion may be provided with an outlet. The above-described example sealing member may also be applied to a shutter that opens or closes (e.g., exposes or covers) the outlet. Hereinafter, examples of a developing device will be described with reference to the accompanying drawings. In addition, in the present specification and drawings, elements having substantially the same functional configuration are denoted by the same reference numerals, so that redundant descriptions will be omitted.

FIG. 1 is a schematic diagram of an image forming apparatus using an electrophotographic method, according to an example.

Referring to FIG. 1, an image forming apparatus 1 may include a developing device 10 to supply a developer to an electrostatic latent image formed on a photoconductor 14 to form a visible toner image, a transfer device to transfer a toner image on a printing medium, and a fusing device 80 to fuse the toner image to the printing medium.

The example image forming apparatus 1 prints a color image by an electrophotographic method. In that regard, the image forming apparatus 1 may include a plurality of developing devices 10, an exposure device 50, a transfer device, and the fusing device 80. The developing devices 10 may be an integrated developing device including a developing roller 13 and the photoconductor 14. The developing devices 10 may include a developing unit including the developing roller 13 and a photosensitive unit including the photoconductor 14. The developing unit and the photosensitive unit may be individually replaced.

The image forming apparatus 1 may further include a plurality of developer cartridges 20 to accommodate developer. The plurality of developer cartridges 20 are connected to the plurality of developing devices 10, respectively, and the developer accommodated in the plurality of developer cartridges 20 is supplied to the plurality of developing devices 10, respectively. For example, the developer accommodated in the developer cartridge 20 may be supplied to the developing device 10 by a developer supply unit 30, that receives the developer from the developer cartridge 20, and a supply duct 40. The plurality of developing devices 10 may include a plurality of developing devices 10C, 10M, 10Y, 10K to form toner images in cyan, magenta, yellow, and black colors. The plurality of developer cartridges 20 may include a plurality of developer cartridges 20C, 20M, 20Y, and 20K in which developers in cyan, magenta, yellow, and black colors are accommodated, respectively. In various situations, such as when the developer accommodated in the developer cartridges 20 is consumed, the developer cartridges 20 may be replaced with new or refurbished developer cartridges 20, and a new developer may be filled in the developer cartridges 20.

The photoconductor 14 is an example of a photoconductor of which an electrostatic latent image may be formed on a surface. The photoconductor 14 may be implemented in the form of a photosensitive drum including a conductive metal pipe and a photosensitive layer formed on an outer circumference thereof. A charging roller 15 is an example of a charger to charge the photoconductor 14 to have a uniform surface potential. Instead of the charging roller 15, a charging brush, a corona charger, or the like may be employed. A cleaning member 17 removes developer remaining on a surface of the photoconductor 14 after an intermediate transfer process to be described later. The cleaning member 17 may be, for example, a cleaning blade that comes into contact with a surface of the photoconductor 14 to scrape off the developer. The waste developer removed from the surface of the photoconductor 14 may be accommodated in a waste developer container 17*a*.

The exposure device 50 scans modulated light according to the image information of each color to the photoconductors 14 of the plurality of developing devices 10C, 10M, 10Y, and 10K, respectively, to form the electrostatic latent image on the photoconductors 14. A developing bias voltage to develop the toner with the corresponding photoconductor 14 is applied to the developing roller 13 of each of the plurality of developing devices 10C, 10M, 10Y, and 10K. Thereby, visible toner images are formed on the surfaces of the plurality of photoconductors 14. The transfer device transfers the toner images formed on the plurality of photoconductors 14 on a printing medium P. In an example, an intermediate transfer-type transfer device is employed. As an example, the transfer device may include an intermediate transfer belt 60, a plurality of intermediate transfer rollers 61 located to face the plurality of photoconductors 14 of the plurality of developing devices 10C, 10M, 10Y and 10K, and a transfer roller 70. When an intermediate transfer bias voltage is applied to the plurality of intermediate transfer rollers 61, the toner images developed on the plurality of photoconductors 14 are intermediately transferred to the intermediate transfer belt 60. The transfer roller 70 is located to face the intermediate transfer belt 60. The printing medium P loaded on paper feed means 90 is transported along a paper feed path 91 and is transported between the transfer roller 70 and the intermediate transfer belt 60. The toner image intermediately transferred onto the intermediate transfer belt 60 is transferred to the printing medium P by the transfer bias voltage applied to the transfer roller 70. In a case where the printing medium P passes through the fusing device 80, the toner image is fixed to the printing medium P by heat and pressure. The printing medium P on which fusing is completed is discharged by a discharge roller 92.

Figure 2:
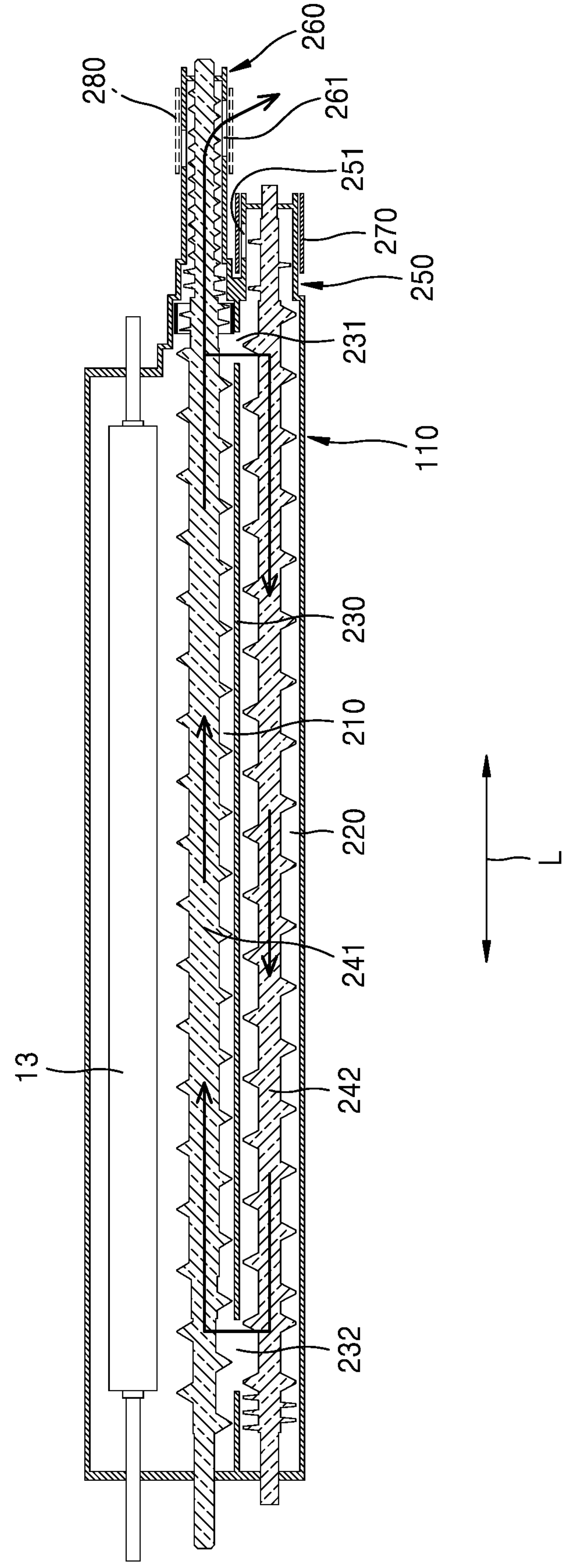
FIG. 2 is a schematic cross-sectional view of a developing device, according to an example.

FIG. 2 is a schematic cross-sectional view of a developing device, according to an example.

Referring to FIG. 2, the developing device may include a developing case 110, a developer supply portion 250 including a supply port 251 and a slit portion (e.g., 253 of FIG. 3), a shutter 270 installed in the developer supply portion 250 to open and close (e.g., expose and cover) the supply port 251, and a sealing member (e.g., 300 of FIG. 3) attached to an outer circumferential portion (e.g., 252 of FIG. 3) of the developer supply portion 250 to reduce or prevent leakage of a developer through the developer supply portion 250 and the shutter 270. As will be explained further with reference to FIG. 3, the sealing member 300 may include a film member 301 that includes an opening 311 in communication with the supply port 251 and a fixing portion 320 that may be inserted into the slit portion 253 and of which an upper surface 312 is in contact with an inner circumferential portion 272 of the shutter 270, and an elastic sealing member 302 that is attached to a lower surface 313 of the film member 301 along an edge of the opening 311 to surround the supply port 251.

A developer may be accommodated in the developing case 110, and the developing roller 13 may be rotatably supported in the developing case 110. As an example, the developing case 110 may include a developing chamber 210 and a stirring chamber 220, and the developing roller 13 may be installed in the developing chamber 210. A partition wall 230 is located between the stirring chamber 220 and the developing chamber 210. The developing chamber 210 and the stirring chamber 220 communicate with each other by connection paths 231 and 232 provided at both end portions in a longitudinal direction L. A first transport member 241 and a second transport member 242 may be provided in the developing chamber 210 and the stirring chamber 220, respectively. The first and second transport members 241 and 242 are to transport the developer in the developing chamber 210 and the stirring chamber 220 in opposite directions from each other in the longitudinal direction L while stirring a toner and a carrier. Given this configuration, the developer is circulated along a circulation path formed by the developing chamber 210, the connecting path 231, the stirring chamber 220, and the connection path 232. Some of the developer transported in the developing chamber 210 may be attached to the developing roller 13, and the toner in the developer may be supplied to the photoconductor 14.

The developer may be supplied from the developer cartridge 20 to the developing case 110. The developer supply portion 250 is connected to the developing case 110 to form a supply passage for the developer. The developer supply portion 250 may extend from, for example, the developing case 110 in the longitudinal direction L, and may be coupled to one end portion of the developing case 110 in the longitudinal direction L. The developer supply portion 250 is provided with the supply port 251 in communication with the developing case 110. The developer accommodated in the developer cartridge 20, that is, the toner and carrier, is supplied to the developing case 110 through the supply port 251. The shutter 270 opens and closes the supply port 251. A sealing structure is applied between the shutter 270 and the developer supply portion 250. Hereinafter, examples of the sealing structure between the developer supply portion 250 and the shutter 270 will be described.

Figure 3:
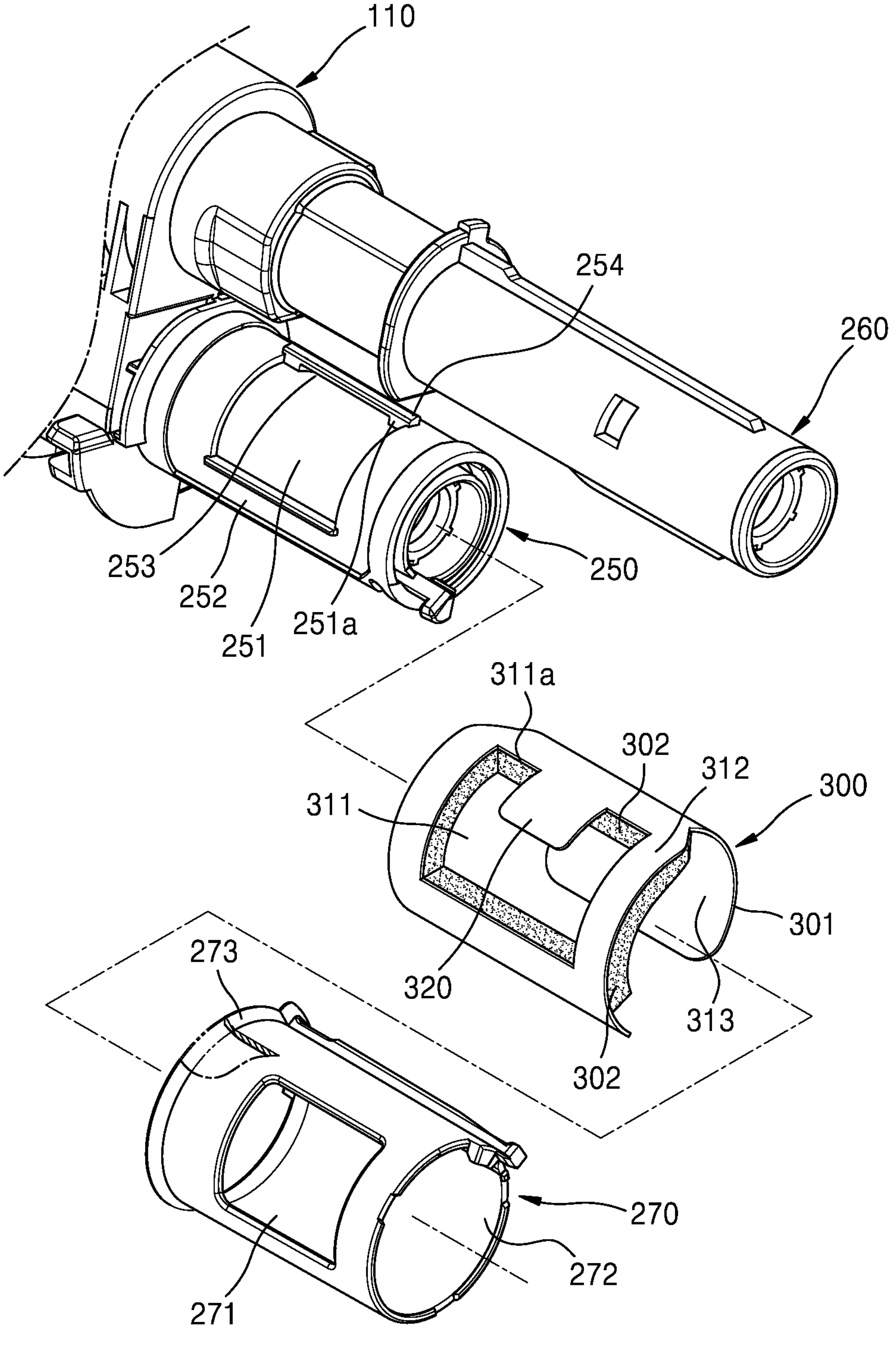
FIG. 3 is a partially exploded perspective view showing an example of a sealing structure.
Figure 4:
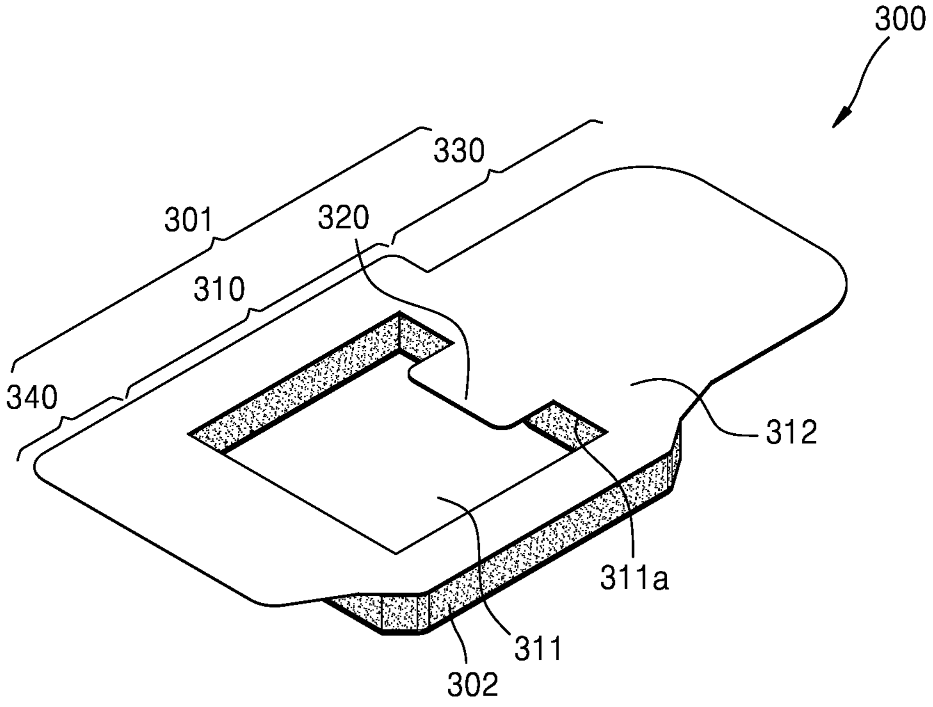
FIG. 4 is a perspective view showing an example of the sealing member shown in FIG. 3.
Figure 5:
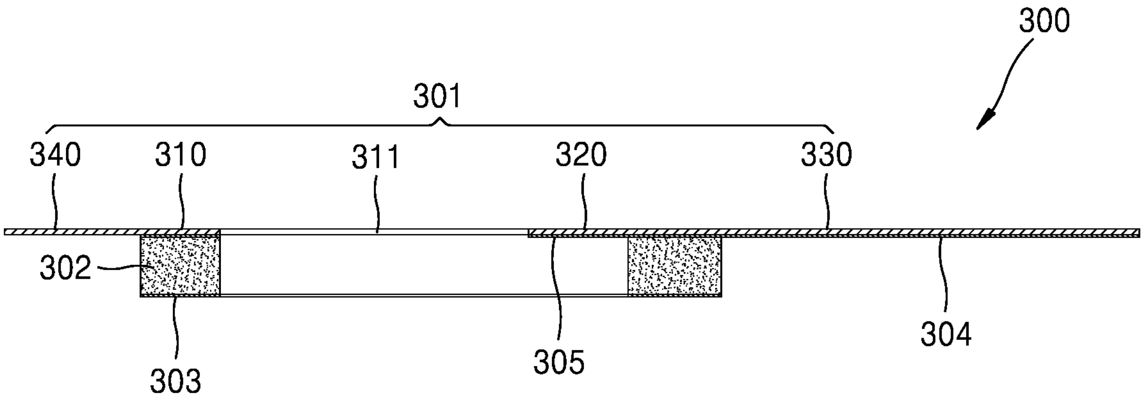
FIG. 5 is a cross-sectional view of the sealing member shown in FIG. 4, according to an example.

FIG. 3 is a partially exploded perspective view showing an example of a sealing structure. FIG. 4 is a perspective view showing an example of the sealing member 300 shown in FIG. 3. FIG. 5 is a cross-sectional view showing an example of the sealing member 300 shown in FIG. 4.

Referring to FIGS. 3 to 5, the developer supply portion 250 may include the supply port 251 to supply a developer to the developing case 110, and the slit portion 253 adjacent to the supply port 251. The sealing member 300 may be attached to the outer circumferential portion 252 of the developer supply portion 250 to reduce or prevent leakage of the developer through the developer supply portion 250 and the shutter 270.

As an example, the developer supply portion 250 may have a cylindrical shape extending in the longitudinal direction L from the developing case 110. The shutter 270 may have a cylindrical shape surrounding the outer circumferential portion 252 of the developer supply portion 250. The shutter 270 may be inserted onto the outer circumferential portion 252 of the developer supply portion 250 in the longitudinal direction L while the sealing member 300 is attached to the outer circumferential portion 252 of the developer supply portion 250. Therefore, the sealing member 300 may be interposed between the developer supply portion 250 and the shutter 270. As shown in FIG. 3, a front end portion 273 of the shutter 270 has a shape expanding outward. Thus, the shutter 270 may be easily inserted onto the outer circumferential portion 252 of the developer supply portion 250. The shutter 270 may be supported by the developer supply portion 250 to be rotated between an open position to expose the supply port 251 and a closed position to block the supply port 251. The shutter 270 is provided with a supply opening 271. The supply opening 271 and the supply port 251 are aligned at the open position, and the supply opening 271 and the supply port 251 are misaligned at the closed position. Thereby, by rotating the shutter 270, the supply port 251 may be opened and closed.

An example of the sealing member 300 may include the film member 301 that is provided with the opening 311 in communication with the supply port 251 and the fixing portion 320 to be inserted into the slit portion 253. The sealing member 300 may further include the film member 301, of which the upper surface 312 is in contact with the inner circumferential portion 272 of the shutter 270, and the elastic sealing member 302 that is attached to the lower surface 313 of the film member 301 along an edge of the opening 311 to surround the supply port 251. The film member 301 may be, for example, a synthetic resin film having low frictional resistance and high flexibility. The film member 301 may have an appropriate thickness that may be flexibly bent according to a shape of the developer supply portion 250. The film member 301 includes a body portion 310 provided with the opening 311. The fixing portion 320 extends from an edge of the opening 311, for example, in an operational direction of the shutter 270, which is an edge 311*a* in a rotational direction of the shutter 270, toward the inside of the opening 311. The elastic sealing member 302 may be implemented by, for example, a foam member having elasticity, for example, by a sponge member. As an example, the elastic sealing member 302 may be a urethane sponge member. The elastic sealing member 302 may be attached to the lower surface 313 of the body portion 310. A first adhesive layer 303 may be provided on a lower surface of the elastic sealing member 302 to attach the elastic sealing member 302 to the outer circumferential portion 252 of the developer supply portion 250. A protrusion portion 254 may be provided between an edge 251*a* of the supply port 251 in the operational direction of the shutter 270 and the slit portion 253 to protrude from the outer circumferential portion 252 to regulate the position of the elastic sealing member 302. The elastic sealing member 302 may have a quadrangular ring shape to surround the supply port 251. By aligning an inner edge of the quadrangular ring-shaped elastic sealing member 302 with the protrusion portion 254, the elastic sealing member 302 may be stably located at a desired position.

The film member 301 may further include a first extension portion 330. The first extension portion 330 may extend from the body portion 310. The first extension portion 330 may extend in the operational direction of the shutter 270 and may be attached to the outer circumferential portion 252 of the developer supply portion 250. To that end, a second adhesive layer 304 may be provided on a lower surface of the first extension portion 330 to attach the first extension portion 330 to the outer circumferential portion 252 of the developer supply portion 250. The film member 301 may further include a second extension portion 340. The second extension portion 340 may extend in a direction opposite to the first extension portion 330 from the body portion 310. In an example, the second extension portion 340 is not attached to the outer circumferential portion 252 of the developer supply portion 250.

Figure 6:
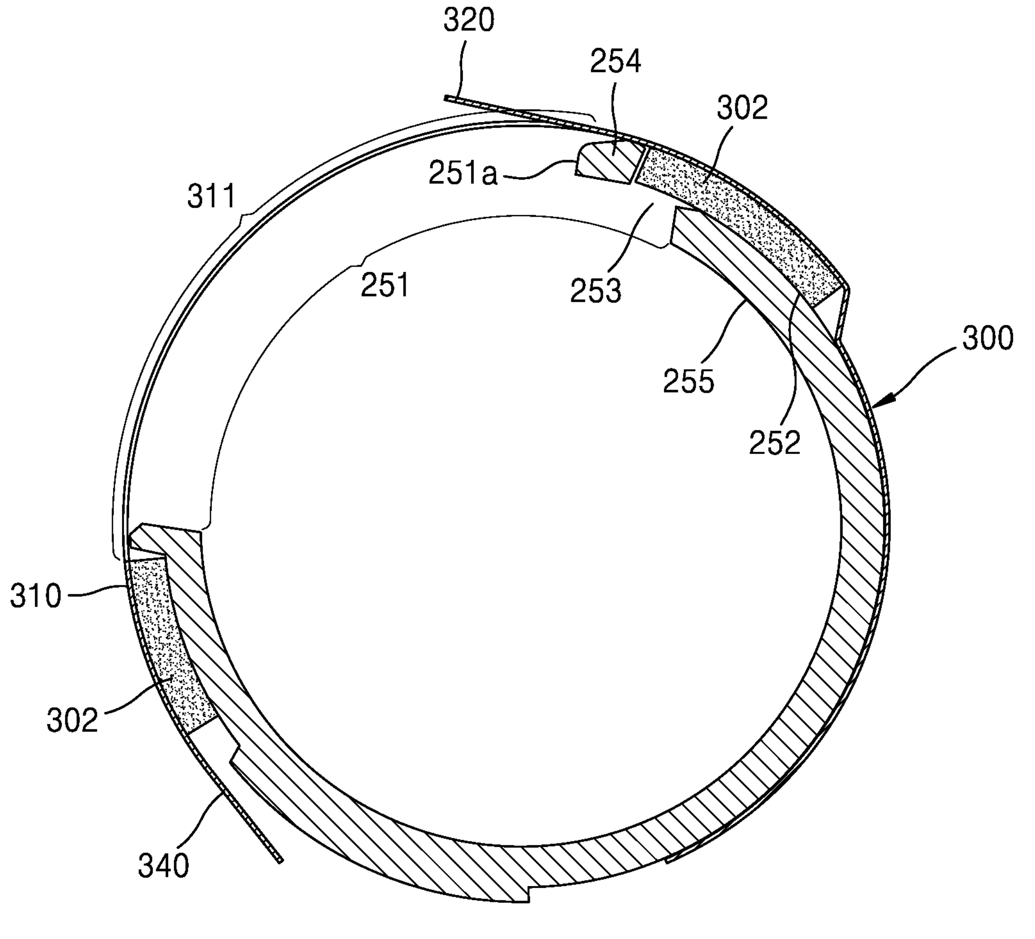
FIG. 6 is a cross-sectional view illustrating a state in which an elastic sealing member and a first extension portion are attached to an outer circumferential portion of a developer supply portion, according to an example.
Figure 7:
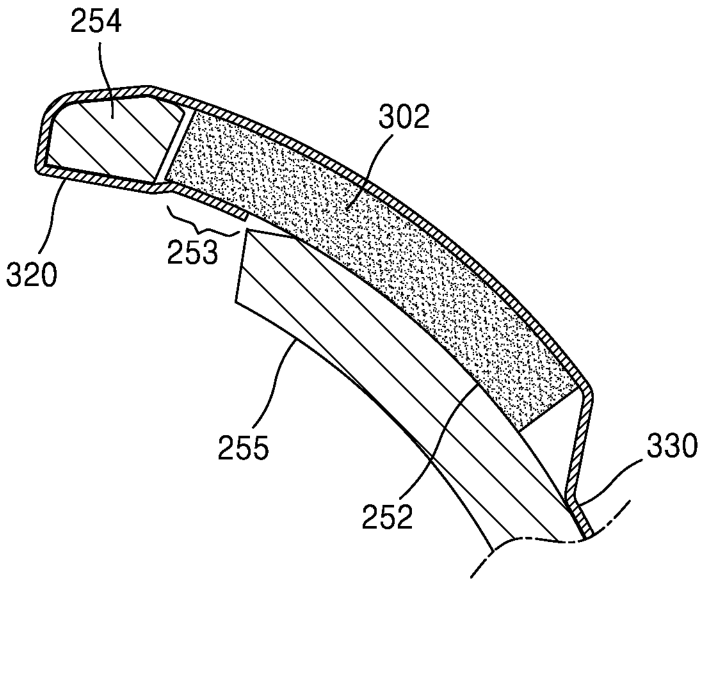
FIG. 7 is a cross-sectional view illustrating a state in which a fixing portion is inserted into a slit portion, according to an example.
Figure 8:
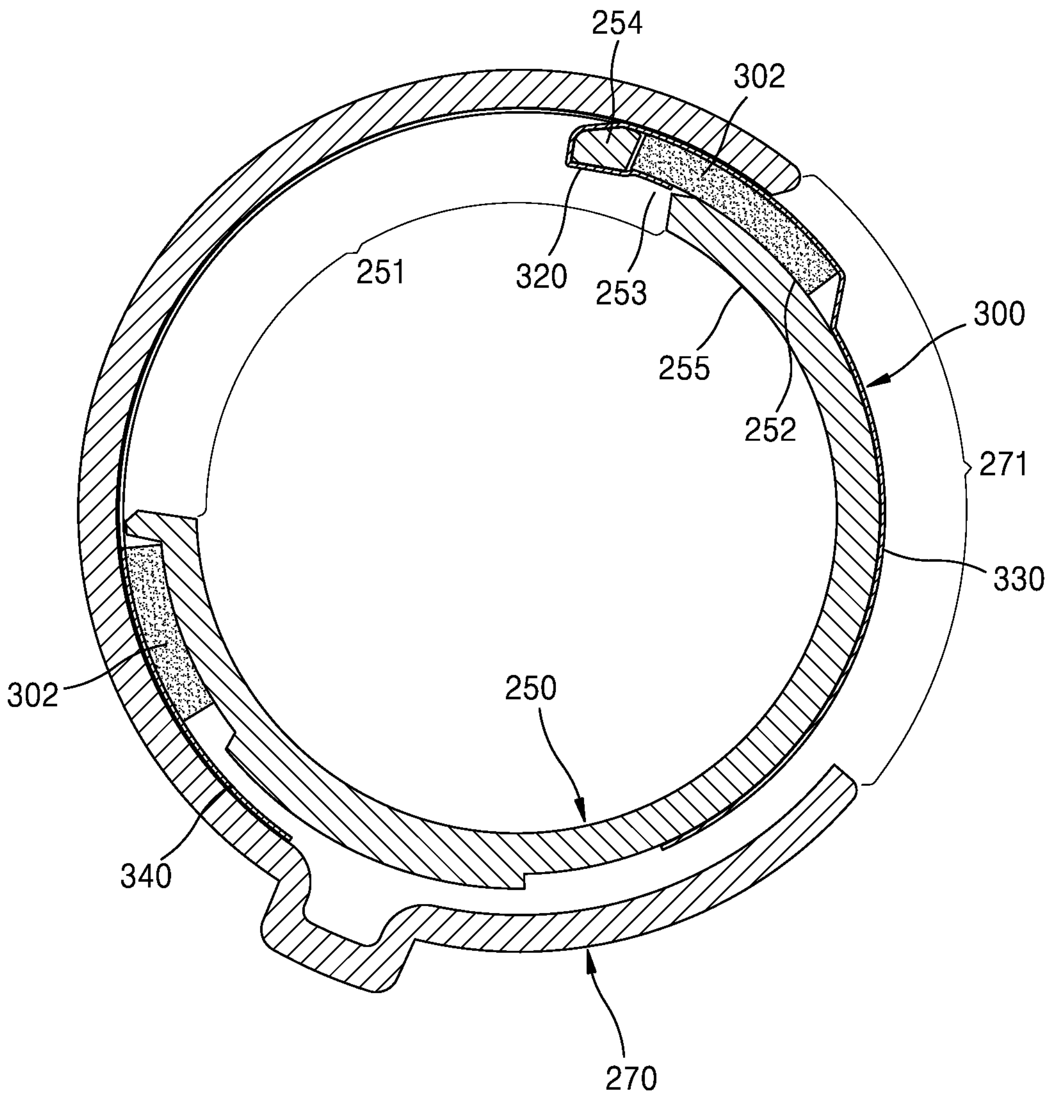
FIG. 8 is a cross-sectional view showing a state in which a shutter is assembled, according to an example.

FIG. 6 is a cross-sectional view illustrating a state in which an elastic sealing member and a first extension portion are attached to an outer circumferential portion of a developer supply portion, according to an example. FIG. 7 is a cross-sectional view illustrating a state in which a fixing portion is inserted into a slit portion, according to an example. FIG. 8 is a cross-sectional view showing a state in which a shutter is assembled, according to an example.

Referring to FIG. 6, the elastic sealing member 302 is attached to the outer circumferential portion 252 of the developer supply portion 250 such that the opening 311 of the film member 301 and the supply port 251 communicate with each other. In that case, an attachment position of the elastic sealing member 302 is regulated by the protrusion portion 254. Thus, the opening 311 and the supply port 251 may be easily aligned.

The fixing portion 320 is in a state extending toward the inside of the opening 311. As shown in FIG. 7, the fixing portion 320 may be bent while surrounding the protrusion portion 254 to be inserted into the slit portion 253 from an inner circumferential portion 255 of the developer supply portion 250 toward the outer circumferential portion 252. The fixing portion 320 may be attached onto a lower surface of the elastic sealing member 302 or onto a lower surface of the first extension portion 330 by the first adhesive layer 303 provided on a lower surface of the elastic sealing member 302 or by the second adhesive layer 304 provided on a lower surface of the first extension portion 330. The fixing portion 320 may be attached to the protrusion portion 254. To that end, a third adhesive layer 305 may be provided on a lower surface of the fixing portion 320.

The first extension portion 330 may be attached to the developer supply portion 250. The first extension portion 330 extends in a rotational direction of the shutter 270 beyond the elastic sealing member 302. In a case where the first extension portion 330 is pressed toward the outer circumferential portion 252 of the developer supply portion 250, the first extension portion 330 is attached to the outer circumferential portion 252 of the developer supply portion 250 by the second adhesive layer 304. The second extension portion 340 extends in a direction opposite to the first extension portion 330 beyond the elastic sealing member 302. The second extension portion 340 is not attached to the outer circumferential portion 252 of the developer supply portion 250. That is, there is no adhesive layer on a lower surface of the second extension portion 340.

Referring to FIG. 8, the shutter 270 may be inserted onto the developer supply portion 250 to cover the sealing member 300. Since the front end portion 273 of the shutter 270 is in an expanded shape, the shutter 270 may be easily inserted onto the developer supply portion 250 while covering the sealing member 300. In this example, the sealing member 300 is interposed between the shutter 270 and the developer supply portion 250. The film member 301 is located on an outermost side of the sealing member 300. Therefore, the film member 301 comes into contact with the inner circumferential portion 272 of the shutter 270. In a case where the shutter 270 is rotated between the open position and the closed position, the inner circumferential portion 272 of the shutter 270 rubs against the upper surface 312 of the film member 301. Since the friction between the film member 301 and the shutter 270 is less than the friction between the shutter 270 and the developer supply portion 250, the operation load of the shutter 270 is reduced, so that the shutter 270 may be stably rotated between the open position and the closed position. Since the elastic sealing member 302 surrounds the supply port 251, and is attached to the outer circumferential portion 252 of the developer supply portion 250, leakage of the developer may be reduced or prevented. Therefore, an increase of the operation load of the shutter 270 caused by the developer or other foreign material being caught between the shutter 270 and the outer circumferential portion 252 of the developer supply portion 250 may be prevented.

In a case where the shutter 270 is rotated, a force pulling in the rotational direction of the shutter 270 is applied to the sealing member 300 due to friction between the shutter 270 and the sealing member 300. The position of the sealing member 300 may be changed by that force. According to the present example, the operation friction force of the shutter 270 is reduced by the film member 301 and thus the pulling force itself may be reduced. In addition, since the fixing portion 320 is inserted into the slit portion 253 while surrounding the protrusion portion 254, a positional change of the sealing member 300 may be prevented despite the pulling force. Since the fixing portion 320 is attached to a lower surface of the elastic sealing member 302, the sealing member 300 may be stably maintained at the attachment position. In a case where the fixing portion 320 is attached to the protrusion portion 254 by the third adhesive layer 305, the positional stability of the sealing member 300 may be improved.

In the example of FIG. 8, the shutter 270 is located at a closed position. The supply opening 271 of the shutter 270 is located to deviate from the supply port 251 of the developer supply portion 250. Therefore, the supply port 251 is closed. In order to open the supply port 251, the shutter 270 may be rotated counterclockwise in the example state shown in FIG. 8.

Figure 9:
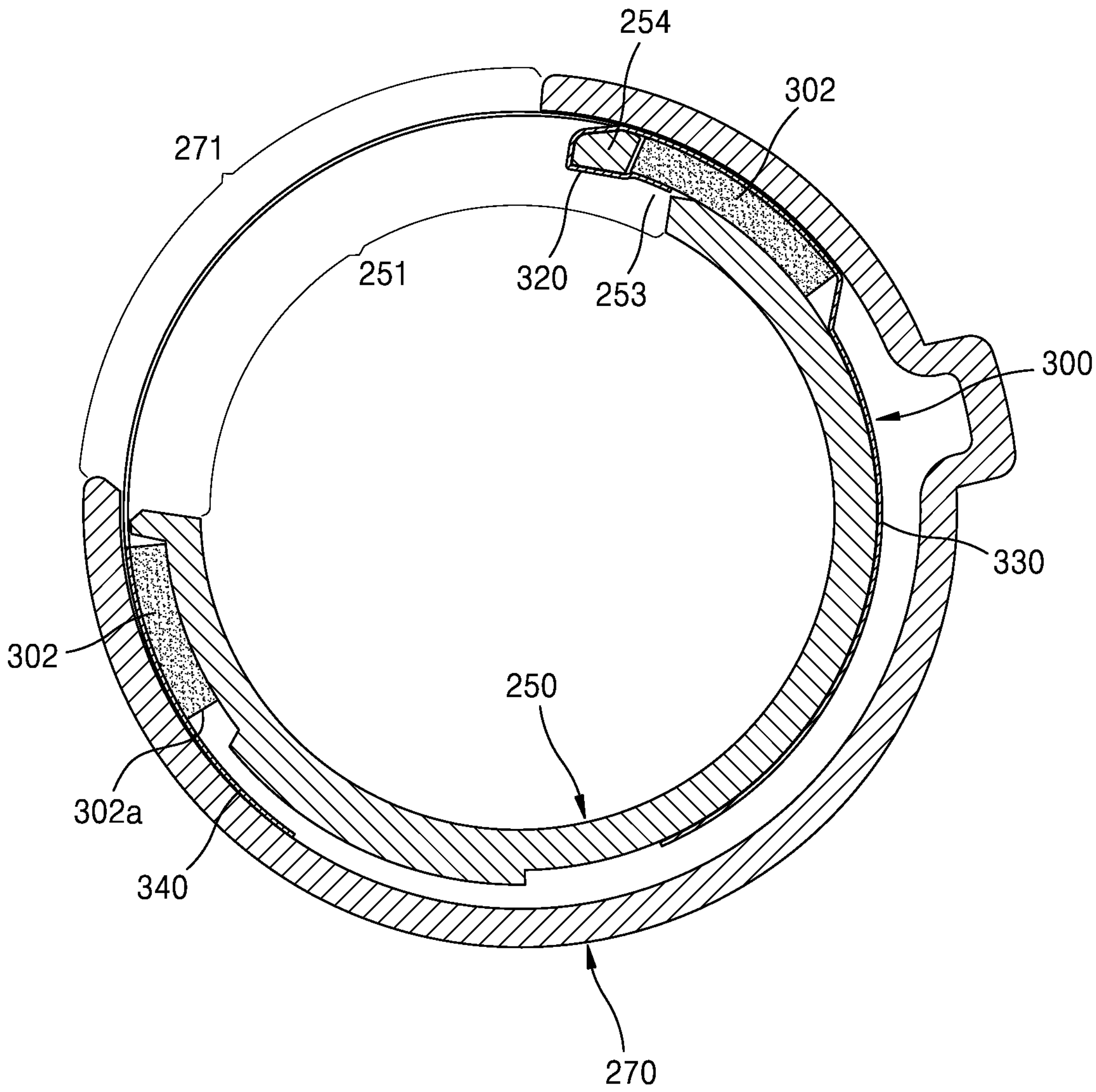
FIG. 9 shows a state in which a shutter is located at an open position, according to an example.

FIG. 9 shows a state in which a shutter is located at an open position, according to an example.

Referring to FIG. 9, in a case where the shutter 270 is located at the open position, the supply opening 271 and the supply port 251 are aligned with each other. Thus, a developer may be supplied into the developing case 110 through the supply port 251.

The second extension portion 340 extends in a direction opposite to the first extension portion 330 beyond the elastic sealing member 302. In a case where an end portion 302*a* of the elastic sealing member 302 is exposed, the end portion 302*a* of the elastic sealing member 302 may be caught by the inner circumferential portion 272 of the shutter 270 when the shutter 270 is rotated between the open position and the closed position, and thus the elastic sealing member 302 may detach from the outer circumferential portion 252 of the developer supply portion 250. According to an example, since the second extension portion 340 covers the end portion 302*a* of the elastic sealing member 302, the end portion 302*a* of the elastic sealing member 302 does not get caught by the inner circumferential portion 272 of the shutter 270. Therefore, the sealing member 300 may avoid being detached from the developer supply portion 250.

In addition, if the second extension portion 340 is attached to the outer circumferential portion 252 of the developer supply portion 250, second extension portion 340 may be pulled during an operation process of the shutter 270. In that case, an assembly failure may occur, in which the end portion 302*a* of the elastic sealing member 302 may be lifted to the outside. Then, in a case where the shutter 270 is rotated, if the lifted end portion 302*a* is caught by the inner circumferential portion 272 of the shutter 270, an operational malfunction of the shutter 270 may be caused, or the elastic sealing member 302 may be partially separated from the outer circumferential portion 252 of the developer supply portion 250. According to the present example, the second extension portion 340 is not attached to the outer circumferential portion 252 of the developer supply portion 250 That is, there is no adhesive layer on a lower surface of the second extension portion 340. Therefore, a defective assembly of the sealing member 300 and an operational malfunction of the shutter 270 accordingly may be prevented.

Figure 10:
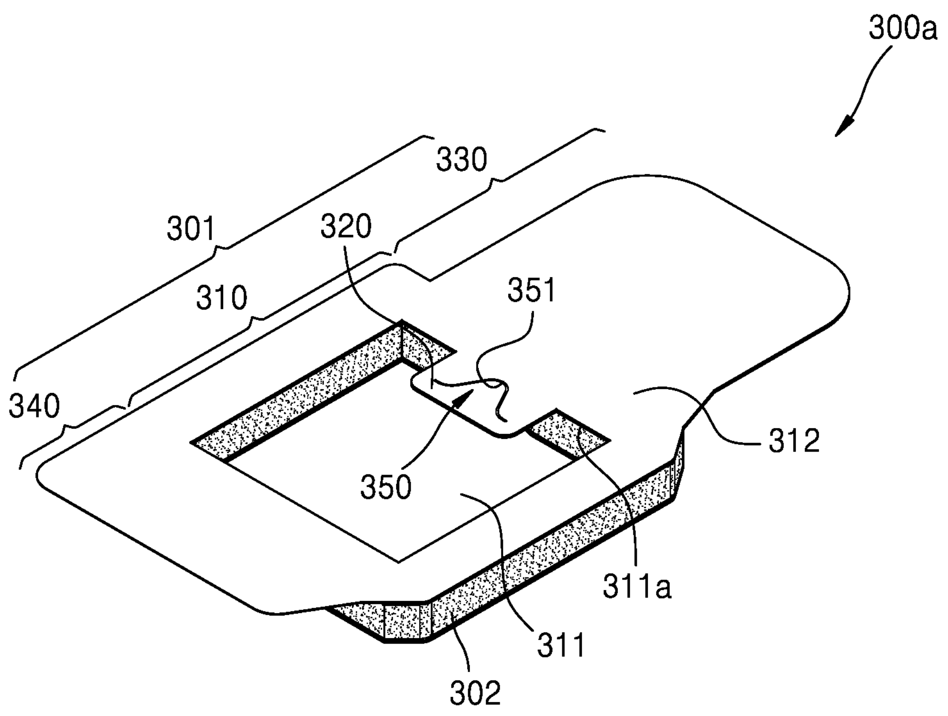
FIG. 10 is a perspective view of a sealing member, according to an example.
Figure 11:
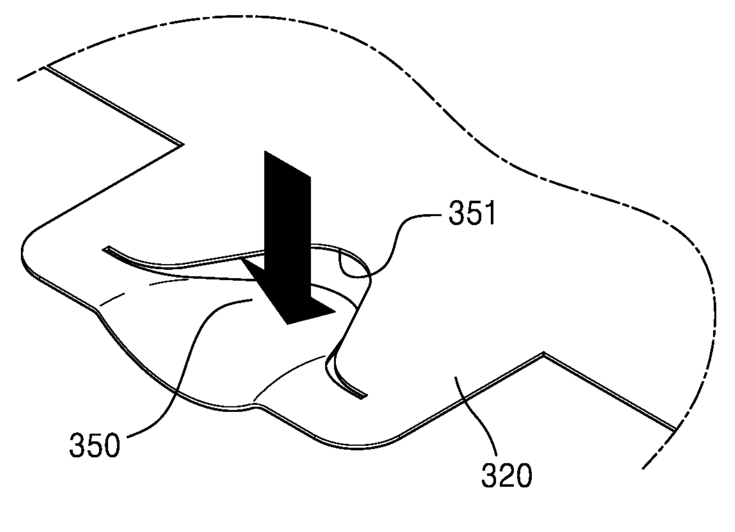
FIG. 11 is a partial perspective view showing a locking portion, according to an example.
Figure 12:
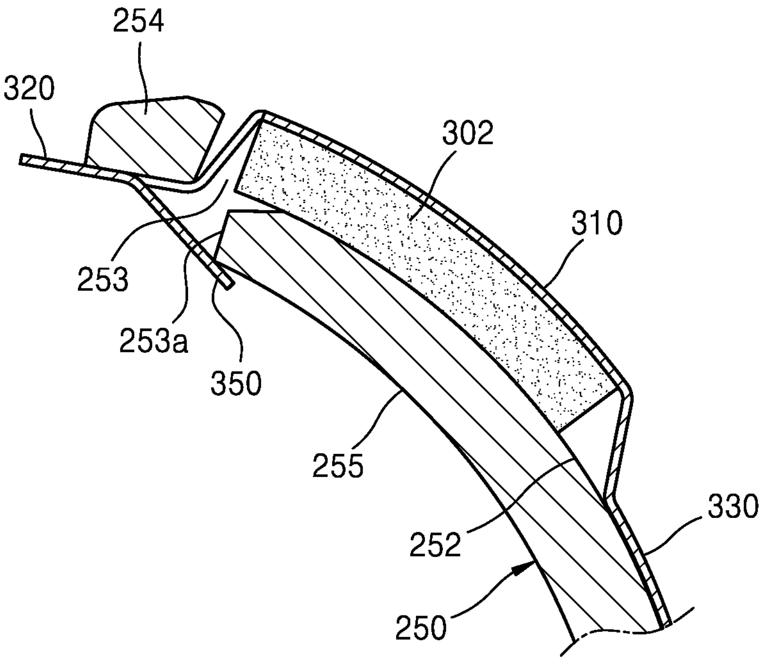
FIG. 12 is a partial cross-sectional view showing a state in which a sealing member is attached to an outer circumferential portion of a developer supply portion, according to an example.

FIG. 10 is a perspective view of a sealing member, according to an example. FIG. 11 is a partial perspective view showing a locking portion, according to an example. FIG. 12 is a partial cross-sectional view showing a state in which a sealing member is attached to an outer circumferential portion of a developer supply portion, according to an example.

A sealing member 300*a* according to an example illustrated in FIGS. 10-12 differs from the sealing member 300 shown in FIGS. 3 and 4 in that a cut line 351 to form a locking portion 350 to catch on an edge of the slit portion 253 is provided in the fixing portion 320. Hereinafter, examples of the sealing member 300*a* will be described.

Referring to FIG. 10, the cut line 351 may be formed such that the locking portion 350 is bent downward from the fixing portion 320. For example, as shown in FIG. 11, if a portion of the fixing portion 320 between an inner edge of the fixing portion 320 and the cut line 351 is pressed downward, as the portion between the inner edge of the fixing portion 320 and the cut line 351 bends downward, the fixing portion 320 is divided into two parts, having the cut line 351 as a boundary to form the locking portion 350. Referring to FIG. 12, in a case where the sealing member 300*a* is attached to the outer circumferential portion 252 of the developer supply portion 250, the fixing portion 320 may be inserted into the slit portion 253 from the outer circumferential portion 252 of the developer supply portion 250 toward the inner circumferential portion 255. In a case where the locking portion 350 is pressed downward, the locking portion 350 is bent downward with respect to the fixing portion 320, based on the cut line 351. The locking portion 350 may be caught on an edge 253*a* of the slit portion 253. Therefore, even if the shutter 270 pulls the sealing member 300*a* in the rotational direction while being rotated, the locking portion 350 is caught on the edge 253*a* of the slit portion 253, so that the sealing member 300*a* is maintained at the attachment position without being separated from the developer supply portion 250 or changing the position.

Figure 13:
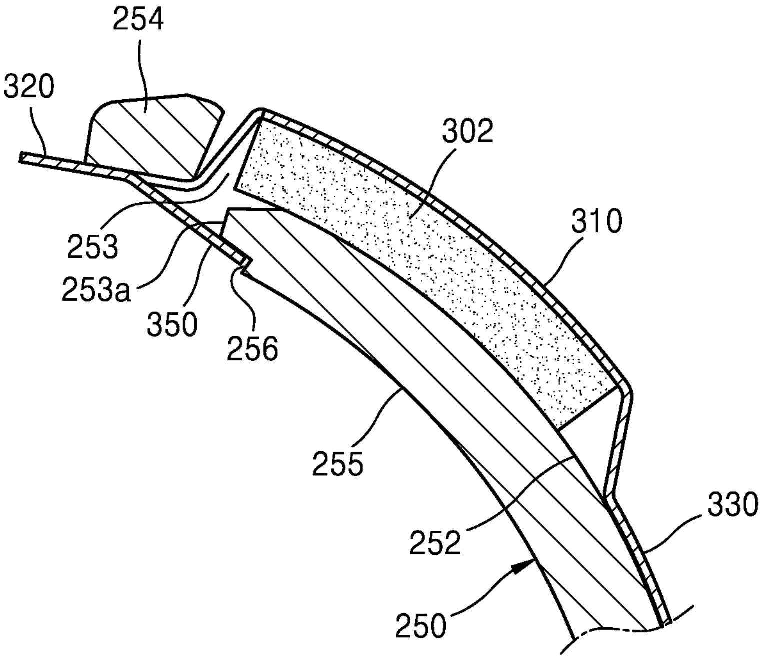
FIG. 13 is a partial cross-sectional view illustrating a state in which a sealing member is attached to an outer circumferential portion of a developer supply portion, according to an example.

FIG. 13 is a partial cross-sectional view showing a state in which a sealing member is attached to an outer circumferential portion of a developer supply portion, according to an example.

Referring to FIG. 13, a recessed portion 256, which is recessed from the inner circumferential portion 255 of the developer supply portion 250, and on which the locking portion 350 may be caught, may be provided at the edge 253*a* of the slit portion 253. In this example, even if the sealing member 300*a* is pulled in the rotational direction while the shutter 270 is rotated, the sealing member 300*a* may be held at the attachment position without being separated from the developer supply portion 250 or changing the position since the locking portion 350 is caught on the recessed portion 256.

Referring back to FIG. 2, in a case where an automatic developer replenishment (ADR) developing method is employed, in order to maintain a constant amount of developer in the developing case 110, excess developer is discharged out of the developing case 110. To that end, the developing device 10 may include a developer discharge portion 260 connected to the developing case 110 to form a discharge path for excess developer. The developer discharge portion 260 may extend in the longitudinal direction L from one end portion of the developing case 110, and may be formed integrally with the developer supply portion 250 to be coupled to the one end portion of the developing case 110. The developer discharge portion 260 is provided with an outlet 261 in communication with the developing case 110. Excess developer may be discharged from the developing case 110 through the outlet 261. A shutter 280 opens and closes the outlet 261. A sealing structure may be applied between the shutter 280 and the developer discharge portion 260. Examples of the sealing structure applied between the developer supply portion 250 and the shutter 270 described in FIGS. 3 to 12 may also be applied between the developer discharge portion 260 and the shutter 280.

As described above, the developing device 10 may include a communication portion provided with a communication port in communication with the inside of the developing case 110 and the slit portion 253, and a shutter installed in the communication portion to open or close the communication port. The sealing member 300 may be interposed between the communication portion and the shutter. The sealing member 300 may include the film member 301 and the elastic sealing member 302. The film member 301 may include the body portion 310 provided with the opening 311 in communication with the communication port, the fixing portion 320 that extends inward from the edge 311*a* of the opening 311 in the operational direction of the shutter to be inserted into the slit portion 253, and the first extension portion 330 extending outward from the body portion 310 in the operational direction of the shutter. The elastic sealing member 302 is attached onto the lower surface 313 of the body portion 310 along an edge of the opening 311 to surround the communication port. The first adhesive layer 303 may be provided on a lower surface of the elastic sealing member 302 to attach the elastic sealing member 302 to an outer circumferential portion of the communication portion. The second adhesive layer 304 may be provided on a lower surface of the first extension portion 330 to attach the first extension portion 330 to the outer circumferential portion of the communication portion. The film member 301 may further include the second extension portion 340 that extends from the body portion 310 in a direction opposite the first extension portion 330, and is not attached to the outer circumferential portion of the communication portion. The protrusion portion 254 may be provided between an edge of the communication port in the operational direction of the shutter and the slit portion 253 to protrude from the outer circumferential portion of the communication portion to regulate the attachment position of the elastic sealing member 302. The fixing portion 320 extends to the inside of the opening 311, may surround the protrusion portion 254, and may be inserted into the slit portion 253 from the inner circumferential portion of the communication portion toward the outer circumferential portion of the communication portion, and the third adhesive layer 305 may be provided on a lower surface of the fixing portion 320 to attach the fixing portion 320 to the protrusion portion 254. The fixing portion 320 may be inserted into the slit portion 253 from the outer circumferential portion of the communication portion toward the inner circumferential portion of the communication portion, and the fixing portion 320 may be provided with the cut line 351 to form the locking portion 350 caught on an edge of the slit portion 253.

The communication portion may include the developer supply portion 250 to form a supply passage for a developer supplied into the developing case 110, and the developer discharge portion 260 to form a discharge passage for excess developer discharged from the developing case 110. For example, the communication portion may be the developer supply portion 250, and the communication port may be the supply port 251. For example, the communication portion may be the developer discharge portion 260, and the communication port may be the outlet 261.

According to the above-described examples, the shutter may be rotated between the open and closed or may be slid along a straight path and moved between the open and closed positions.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A developing device comprising:

a developing case to accommodate a developer;

a developer supply portion connected to the developing case, the developer supply portion including a supply port to supply the developer to the developing case and a slit portion adjacent to the supply port;

a shutter coupled to the developing supply portion to open or close the supply port; and a sealing member, attached to an outer circumferential portion of the developer supply portion the sealing member including a film member having an opening in communication with the supply port;

an elastic sealing member; and a fixing portion that extends toward an inside of the opening to be inserted into the slit portion by surrounding an edge of the supply port so that the fixing portion is attached to a lower surface of the elastic sealing member via the slit portion.

2. The developing device of claim 1, wherein the film member comprises a first extension portion that extends in an operational direction of the shutter and is attached to the outer circumferential portion of the developer supply portion.

3. The developing device of claim 2, wherein the film member further comprises a second extension portion extending in a direction opposite to the first extension portion, and wherein the second extension portion is not attached to the outer circumferential portion of the developer supply portion.

4. The developing device of claim 1, wherein the shutter is rotatably supported on the outer circumferential portion of the developer supply portion to open or close the supply port.

5. The developing device of claim 1, wherein the fixing portion extends from an edge of the opening in an operational direction of the shutter toward an inside of the opening.

6. The developing device of claim 5, wherein a protrusion portion is provided between an edge of the supply port in the operational direction of the shutter and the slit portion to protrude from the outer circumferential portion of the developer supply portion to regulate a position of the elastic sealing member.

7. The developing device of claim 6, wherein the fixing portion extends toward the inside of the opening, surrounds the protrusion portion, and is inserted into the slit portion from an inner circumferential portion of the developer supply portion toward the outer circumferential portion of the developer supply portion.

8. The developing device of claim 7, wherein the fixing portion is attached to the protrusion portion.

9. The developing device of claim 5, wherein the fixing portion is inserted into the slit portion from the outer circumferential portion of the developer supply portion toward an inner circumferential portion of the developer supply portion, and wherein the fixing portion is provided with a cut line to form a locking portion caught on an edge of the supply port.

10. The developing device of claim 1, wherein an upper surface of the film member contacts an inner circumferential portion of the shutter.

11. The developing device of claim 1, wherein the elastic sealing member is attached to a lower surface of the film member along an edge of the opening and surrounds the supply port.

12. A developing device comprising:

a developing case;

a communication portion connected to the developing case, the communication portion including a communication port in communication with an inside of the developing case and a slit portion adjacent to the communication port;

a shutter coupled to the communication portion to open or close the communication port;

a film member including a body portion having an opening in communication with the communication port, a fixing portion that extends from an edge of the opening in an operational direction of the shutter to be inserted into the slit portion, and a first extension portion extending outward from the body portion in the operational direction of the shutter;

an elastic sealing member attached to a lower surface of the body portion along an edge of the opening to surround the communication port;

a first adhesive layer on a lower surface of the elastic sealing member to attach the elastic sealing member to an outer circumferential portion of the communication portion; and a second adhesive layer on a lower surface of the first extension portion to attach the first extension portion to the outer circumferential portion of the communication portion.

13. The developing device of claim 12, wherein the film member includes a second extension portion that extends from the body portion in a direction opposite to the first extension portion and is not attached to the outer circumferential portion of the communication portion.

14. The developing device of claim 12, wherein a protrusion portion is provided between an edge of the communication port in an operational direction of the shutter and the slit portion to protrude from the outer circumferential portion of the communication portion to regulate an attachment position of the elastic sealing member.

15. The developing device of claim 14, wherein the fixing portion extends toward an inside of the opening, surrounds the protrusion portion, and is inserted into the slit portion from an inner circumferential portion of the communication portion toward the outer circumferential portion of the communication portion, and wherein a third adhesive layer is provided on a lower surface of the fixing portion to attach the fixing portion to the protrusion portion.

16. The developing device of claim 14, wherein the fixing portion is inserted into the slit portion from the outer circumferential portion of the communication portion toward an inner circumferential portion of the communication portion, and wherein the fixing portion is provided with a cut line to form a locking portion caught on an edge of the slit portion.

17. The developing device of claim 12, wherein the communication portion includes developer supply portion to form a supply passage of a developer supplied to the developing case or a developing discharge portion to form a discharge passage of developer from the developing case.

* * * * *